United States Patent
Ebrahimi Afrouzi et al.

(10) Patent No.: US 11,443,508 B1
(45) Date of Patent: *Sep. 13, 2022

(54) METHODS FOR AN AUTONOMOUS ROBOTIC DEVICE TO IDENTIFY LOCATIONS CAPTURED IN AN IMAGE

(71) Applicants: Ali Ebrahimi Afrouzi, San Diego, CA (US); Sebastian Schweigert, Oakland, CA (US); Chen Zhang, Richmond (CA); Hao Yuan, Fremont, CA (US)

(72) Inventors: Ali Ebrahimi Afrouzi, San Diego, CA (US); Sebastian Schweigert, Oakland, CA (US); Chen Zhang, Richmond (CA); Hao Yuan, Fremont, CA (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,175

(22) Filed: Sep. 15, 2020

Related U.S. Application Data

(63) Continuation of application No. 16/219,647, filed on Dec. 13, 2018, now Pat. No. 10,810,427.

(60) Provisional application No. 62/620,043, filed on Jan. 22, 2018, provisional application No. 62/626,244, filed on Feb. 5, 2018, provisional application No. 62/620,053, filed on Jan. 22, 2018, provisional application No. 62/599,459, filed on Dec. 15, 2017.

(51) Int. Cl.
| | |
|---|---|
| *G06V 20/10* | (2022.01) |
| *B25J 9/16* | (2006.01) |
| *G05D 1/02* | (2020.01) |
| *G06T 7/187* | (2017.01) |

(52) U.S. Cl.
CPC ............ *G06V 20/10* (2022.01); *B25J 9/1697* (2013.01); *G05D 1/0246* (2013.01); *G06T 7/187* (2017.01)

(58) Field of Classification Search
CPC . G06K 9/00664; G05D 1/0246; B25J 9/1697; G06T 7/187
See application file for complete search history.

(56) References Cited

U.S. PATENT DOCUMENTS

| | | |
|---|---|---|
| 5,031,228 A | 7/1991 | Lu |
| 6,033,415 A | 3/2000 | Mittelstadt et al. |
| 6,232,735 B1 | 5/2001 | Baba et al. |
| 6,560,354 B1 | 5/2003 | Maurer, Jr. et al. |
| 6,597,143 B2 | 7/2003 | Song et al. |
| 8,131,118 B1 | 3/2012 | Jing et al. |
| 10,452,071 B1 * | 10/2019 | Ebrahimi Afrouzi ....... B25J 9/1676 |

(Continued)

*Primary Examiner* — Asghar H Bilgrami

(57) ABSTRACT

Provided are operations including: receiving, with one or more processors of a robot, an image of an environment from an imaging device separate from the robot; obtaining, with the one or more processors, raw pixel intensity values of the image; extracting, with the one or more processors, objects and features in the image by grouping pixels with similar raw pixel intensity values, and by identifying areas in the image with greatest change in raw pixel intensity values; determining, with the one or more processors, an area within a map of the environment corresponding with the image by comparing the objects and features of the image with objects and features of the map; and, inferring, with the one or more processors, one or more locations captured in the image based on the location of the area of the map corresponding with the image.

20 Claims, 4 Drawing Sheets

(56) References Cited

U.S. PATENT DOCUMENTS

| | | | | |
|---|---|---|---|---|
| 2007/0100780 A1* | 5/2007 | Fleischer | ........... | G06K 9/00664 |
| | | | | 706/15 |
| 2017/0197311 A1* | 7/2017 | Garcia | ................. | G01S 15/931 |
| 2017/0358099 A1* | 12/2017 | Harris | ....................... | G06T 7/55 |
| 2018/0322646 A1* | 11/2018 | Matthies | ............... | B64C 39/024 |
| 2019/0197774 A1* | 6/2019 | Molyneaux | ........... | G06T 7/0002 |

* cited by examiner

METHODS FOR AN AUTONOMOUS ROBOTIC DEVICE TO IDENTIFY LOCATIONS CAPTURED IN AN IMAGE

CROSS-REFERENCE TO RELATED APPLICATIONS

This application is a Continuation of U.S. Non-Provisional patent application Ser. No. 16/219,647, filed Dec. 13, 2018, which claims the benefit of U.S. Provisional Patent Application Nos. 62/599,459, filed Dec. 15, 2017, 62/620,043 filed Jan. 22, 2018, 62/620,053, filed Jan. 22, 2018, and 62/626,244 filed Feb. 5, 2018, each of which is hereby incorporated by reference.

In this patent, certain U.S. patents, U.S. patent applications, or other materials (e.g., articles) have been incorporated by reference. Specifically, U.S. patent application Ser. Nos. 15/272,752, 15/949,708, 16/048,179, 16/048,185, 16/163,541, 16/163,562, 16/163,508, 62/681,965, 62/614,449, 16/109,617, 16/041,286, 15/406,890, 14/673,633, 16/163,530, 62/613,005, 62/616,928, 15/614,284, 14/817,952, 62/666,266, and 62/590,205 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD

This disclosure relates to mobile robotic devices and more particularly to navigation of mobile robotic devices.

BACKGROUND

Mobile robotic devices are increasingly used to automate tasks within an environment. In some instances, the tasks executed by a mobile robotic device are executed in all areas of the environment. However, in some cases, the execution a task in a particular location may be required. In such instances, a mobile robotic device executes a task in a particular location by, for example, physically directing the mobile robotic device to the particular location or by using a remote control to drive the mobile robotic device to the particular location.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include one or more tangible, non-transitory, machine-readable medium storing instructions that when executed by one or more processors effectuate operations including: receiving, with the one or more processors of a robot, an image of an environment from an imaging device separate from the robot; obtaining, with the one or more processors of the robot, raw pixel intensity values of the image; extracting, with the one or more processors of the robot, objects and features in the image by grouping pixels with similar raw pixel intensity values, and by identifying areas in the image with greatest change in raw pixel intensity values; determining, with the one or more processors of the robot, an area within a map of the environment corresponding with the image by comparing the objects and features of the image with objects and features of the map; inferring, with the one or more processors of the robot, one or more locations captured in the image based on the location of the area of the map corresponding with the image; and, instructing, by the one or more processors of the robot, the robot to navigate to the one or more locations captured in the image.

Some aspects include an apparatus including: a robot including: a chassis; drive wheels connected to the chassis; one or more processors; one or more sensors; and, one or more tangible, non-transitory, machine-readable medium storing instructions that when executed by the one or more processors effectuate operations of the above-mentioned process.

Some aspects include a method including: generating, with a processor of a robot, a map of an environment of the robot and a path of the robot within the environment; transmitting, with the processor of the robot, the map of the environment and the path of the robot to an application of a computing device paired with a wireless controller of the robot; displaying, with the application of the computing device, the map and the path of the robot; receiving, with the application of the computing device, an input designating an instruction comprising at least one of: the path of the robot, an adjustment to the path of the robot, an adjustment to the map, an order of rooms within the environment the robot is to perform work within, areas within the environment the robot is to perform work within, areas within the environment the robot is to avoid, a type of work the robot is to perform within an area, a location within the environment the robot is to navigate to, a modification to a pre-existing label of an area within the environment, and a label for an area within the environment, wherein: the robot includes: a chassis; drive wheels connected to the chassis; a plurality of sensors comprising at least one of a laser distance sensor and a camera; and a tangible, non-transitory, machine-readable medium; and the computing device includes: a processor; a tangible, non-transitory, machine-readable medium; a microphone; a speaker; a screen; at least one user interface; and a camera.

DETAILED DESCRIPTION OF SOME EMBODIMENTS

Figure 1:
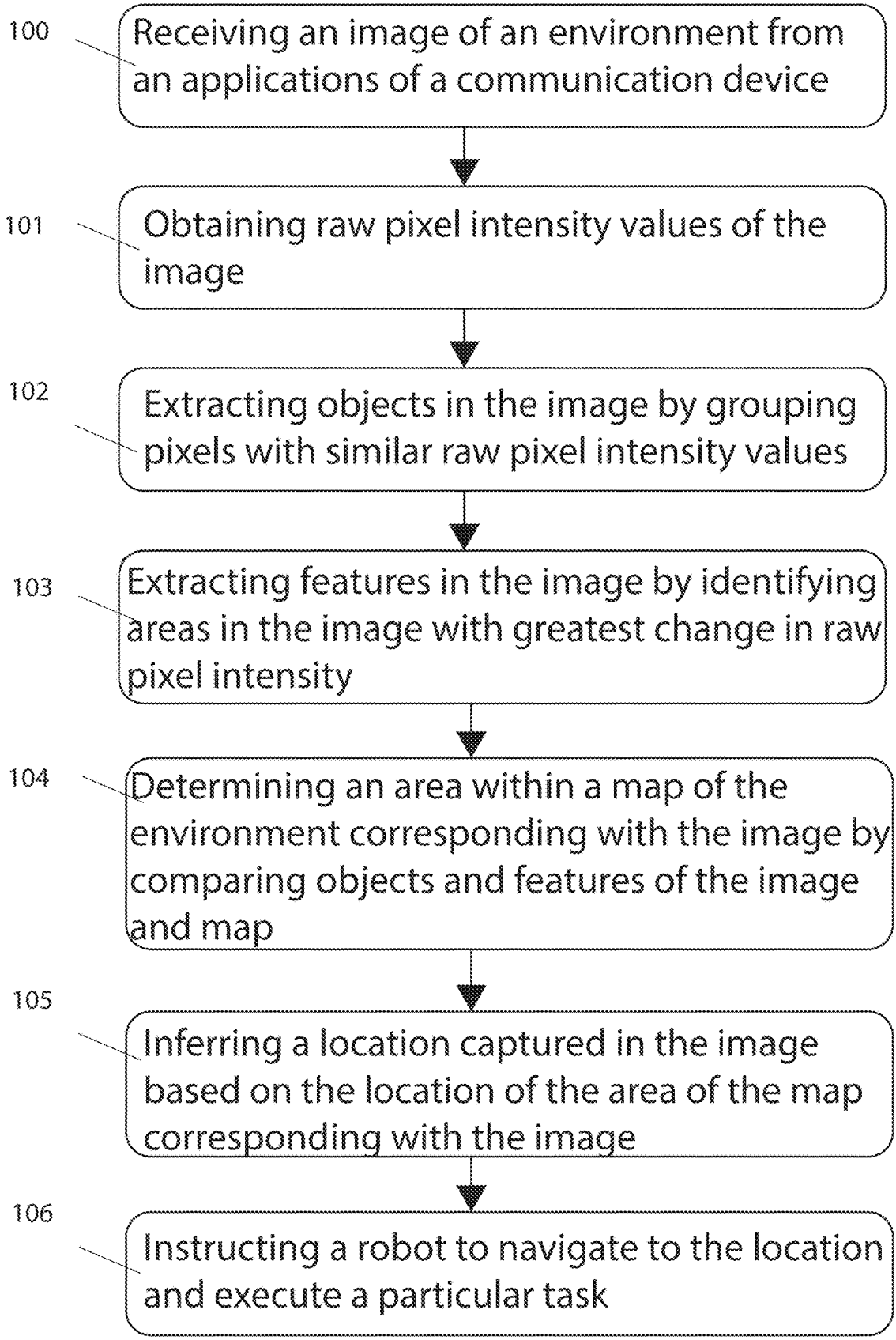
FIG. 1 illustrates a flowchart describing an example of a method for identifying a location captured in an image within a map of the environment in some embodiments.
Figure 2A:
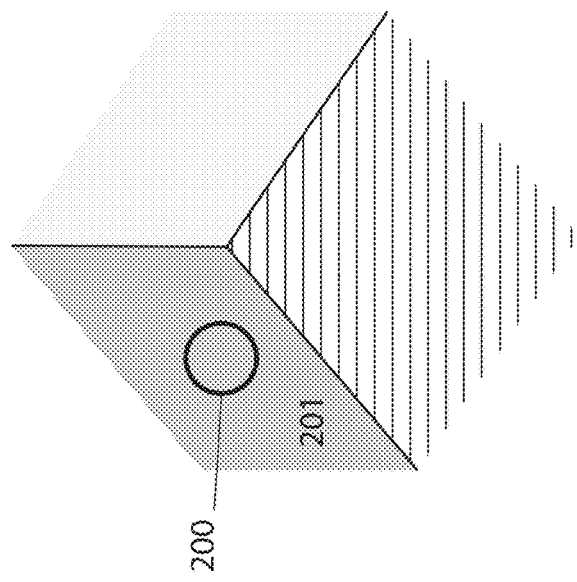
FIG. 2A-2F illustrate an embodiment of a camera detecting a corner in some embodiments.
Figure 2B:
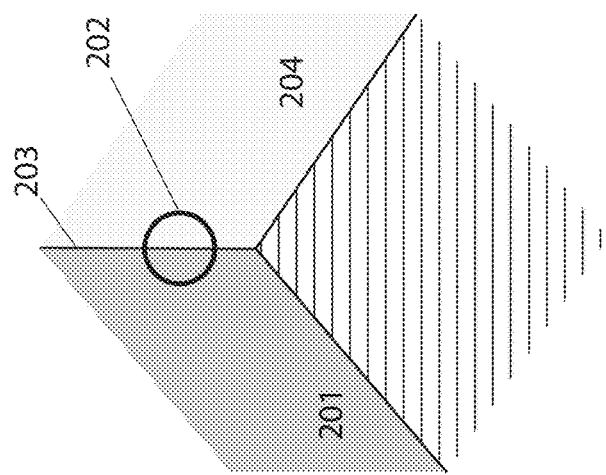
Figure 2C:
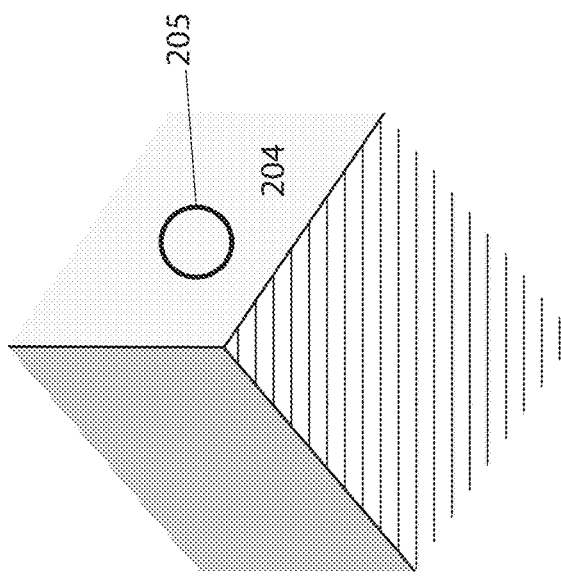
Figure 2F:
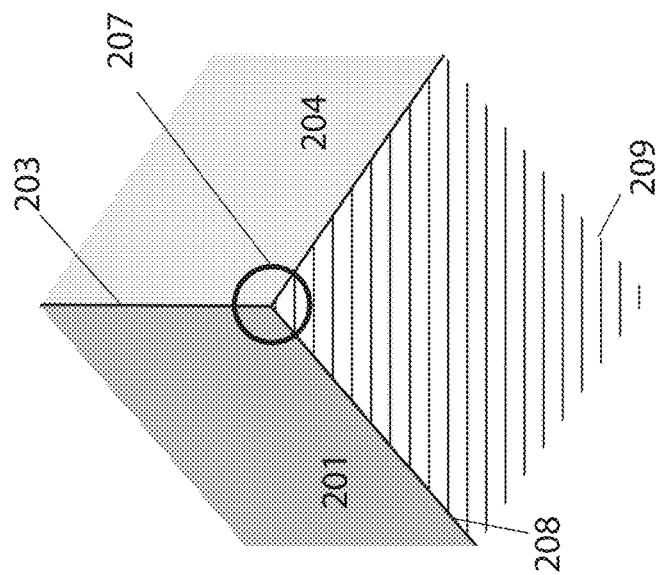
Figure 2E:
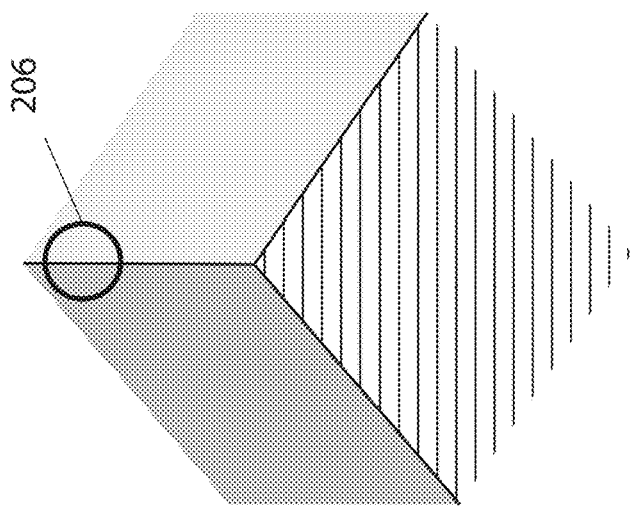
Figure 2D:
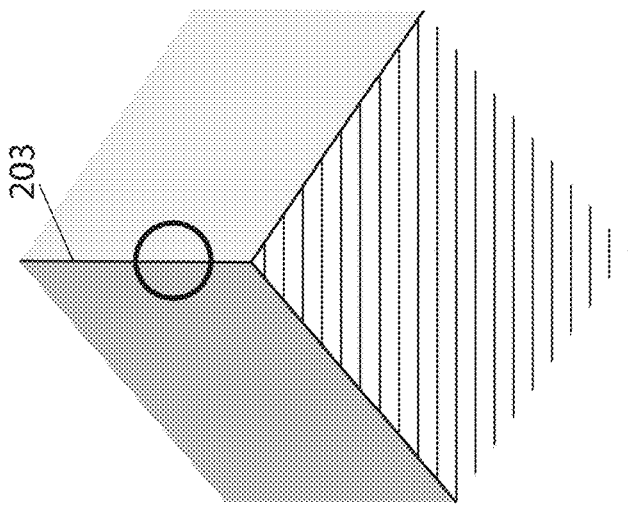

The present techniques will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present techniques may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implementing all of those techniques, as various cost and engineering trade offs may warrant systems that only afford a subset of the benefits described herein or that will be apparent to one of ordinary skill in the art.

Some embodiments provide an application of a communication device paired with a robotic device. Examples of a communication device include a smartphone, a tablet, a laptop, a remote, and other communication devices capable of communicating information with the robotic device. In some embodiments, the application of the communication device accesses the camera of the communication device to capture images of the environment. In some embodiments, the camera of the communication device captures images of the environment and the application of the communication device accesses the previously captured images and uploads them. In some embodiments, the application of the communication device wirelessly transmits the images to a processor of the robotic device. In some embodiments, the processor identifies the locations captured in the images within a map of the environment by identifying similarities in features in the captured images and in the map of the environment. In some embodiments, the processor instructs the robotic device to navigate and/or service the locations identified in the captured images.

In some embodiments, the time or type of service for the locations captured in the images are specified using the application of the communication device and transmitted to the processor of the robotic device such that the processor instructs the robotic device to service the locations captured in the images at the specified time or using the specified service type (e.g., mopping, vacuuming, UV sterilization, etc.). In some embodiments, the processor of the robotic device instructs the robotic device to service the locations captured in the images immediately upon receiving images from the application of the communication device. In some embodiments, the order of service for the locations captured in the images are specified using the application of the communication device and transmitted to the processor of the robotic device such that the processor instructs the robotic device to service the locations captured in the images in the particular order specified. In some embodiments, the processor of the robotic device autonomously determines the order of service of the locations captured in the images using methods such as those described in U.S. patent application Ser. Nos. 14/817,952, 62/666,266, and 62/590,205, the entire contents of which are hereby incorporated by reference. In some embodiments, the path of the robotic device is specified using the application of the communication device and transmitted to the processor of the robotic device such that the processor instructs the robotic device to service the locations captured in the images by following along the specified path. In some embodiments, the processor of the robotic device autonomously determines the path of the robotic device using methods such as those described in U.S. patent application Ser. Nos. 16/041,286, 15/406,890, 14/673,633, and 16/163,530, the entire contents of which are hereby incorporated by reference.

In some embodiments, the application of the communication device is used to label locations captured in the images. In some embodiments, icons of common types of rooms are placed over corresponding locations in a captured image to label the locations as such. For example, locations captured in images can be labelled as, kitchen, bathroom, bedroom, office, etc. In some embodiments, the application of the communication device labels the locations captured in the images using a default naming structure such as, region 1, region 2, region 3, etc. In some embodiments, instructions for servicing locations of the environment are specified using the labels of different locations. In some embodiments, the processor labels locations captured in the images. In some embodiments, wherein multiple locations within an environment are captured in a single image, one or more locations within the captured image are selected using the application of the communication device. In some embodiments, the processor labels the corresponding locations in the map of the environment with the same name. In some embodiments, the processor identifies locations by their labelled names until they are changed. For example, the processor accepts voice commands for different locations of the environment using their labelled names.

In some embodiments, captured images are edited using tools (e.g., drawing tools) of the application of the communication device. In some embodiments, modifications to the captured images are used to indicate a particular action of the robotic device. For example, different locations captured in an image can be color coded using tools of the application of the communication device, wherein each color indicates a different action of the robotic device (e.g., mopping, vacuuming, UV sterilization, restricted area, high or low suction, fast or slow robot speed, frequency of service, etc.). In some embodiments, different colors can also have different meanings (e.g., real or virtual boundary, level of debris accumulation, floor type, obstacle, door, etc.). For example, a red line drawn on an image is indicative of a boundary of the environment or a blue circle drawn on an image is indicative of a location with high levels of debris accumulation. In some embodiments, the processor uses boundaries drawn on captured images to update its map of the environment. In some embodiments, the processor completes a drawn boundary line if a gap between two adjacent aligned lines is less than a predetermined threshold. For example, the processor extends a yellow line drawn across a doorway indicating a virtual boundary such that it connects with the adjacent aligned wall to close a small gap (e.g., <10% the width of the doorway opening) between the drawn line and the wall. In other embodiments, different shapes or patterns correspond with different actions of the robotic device or different meanings. For instance, a diamond drawn over the locations in the captured images indicates the use of high suction during operation in those areas while a square drawn over the locations in the captured images indicates the use of low suction during operation in those area. In some embodiments, the application of the communication device determines the action or meaning corresponding with each color, shape and/or pattern and in other embodiments, the action or meaning corresponding with each color, shape and/or pattern is chosen using the application of the communication device.

In some embodiments, a graphical user interface, such as those described in U.S. patent application Ser. Nos. 15/272,752 and 15/949,708, the entire contents of which is hereby incorporated by reference, is used for launching the camera of the communication device to capture images, uploading images, selecting locations within images, editing images, labelling locations of the environment in images or a map, choosing or modifying robotic device settings, providing instructions to the robotic device, monitoring the status of the robotic device, setting a schedule of the robotic device, choosing or modifying a path of the robotic device, choosing or modifying areas of an environment, choosing or modifying the order of servicing areas, viewing and editing a map of the environment, transmitting information to and from the robotic device, and performing other actions related to the robotic device.

In some embodiments, the application of the communication device stitches multiple consecutive images together to create a larger image. In some embodiments, the camera captures a panoramic image. In some embodiments, wherein multiple locations within an environment are captured in a single image, one or more locations within the captured image are selected using the application of the communication device.

In some embodiments, a finger, a stylus, a pen, a cursor, a pointer, a mouse, a button or buttons, or a keyboard are used to interact with the graphical user interface of the application of the communication device.

In some embodiments, the processor uses pixel color intensity to extract different objects (e.g., floor, wall, furniture) and features in the captured images (e.g., boundaries between objects, edges, corners, shapes, color, etc.). In some embodiments, the processor matches features in the captured images with those in a map of the environment to determine the locations captured in the images. In some embodiments, the processor of the robotic device instructs the robotic device to navigate to and/or service the locations captured in the images. In some embodiments, the instructions provided to the robotic device with respect to the locations captured in the images are chosen using the application of the communication device and transmitted to the processor of the robotic device.

In some embodiments, the processor extracts objects (e.g., floor, walls, furniture, etc.) captured in an image using pixel vectors (r, g, b) of the pixels in the captured image. In some embodiments, the processor applies a thresholding method to identify different objects captured within the image as different objects have different ranges of pixel color intensities. For example, the processor can separate a white wall captured in an image having a high range of pixel color intensities from a dark colored hardwood floor having low range of pixel color intensities by thresholding. In some embodiments, the processor assigns all pixels with pixel color intensities below a certain threshold a pixel color intensity value of zero and all pixels with pixel color intensities above the threshold a pixel color intensity value of 255. In some embodiments, the processor discards or segments all pixels with pixel color intensities below a certain threshold, leaving only the pixels of interest. In some embodiments, the processor extracts objects and features in the captured image by grouping pixels of the captured image by pixel color intensity values r, g, and b. For example, if pixel vectors (r, g, b) are represented in a three-dimensional color space, all pixels having the same r value will form a plane, all pixels having the same r and g values will form a line, and all pixels having the same r, g, and b values will form a point. In a map of the environment, pixels with similar colors are positioned close to one another and in some embodiments, the group of pixels with similar colors collectively form an object captured in the image.

Some embodiments implement density-based spatial clustering of applications with noise (DB-SCAN) on pixel color intensity r, g, and b of pixels of the captured image to determine a plurality of clusters, each corresponding to pixels of the same feature of an object. Some embodiments execute a density-based clustering algorithm, like DB-SCAN, to establish groups corresponding to the resulting clusters and exclude outliers. To cluster according to pixel color intensity of pixels, some embodiments iterate through each of the pixel vectors (r, g, b) of the pixels and designate a pixel vector as a core pixel vector if at least a threshold number of the other pixel vectors are within a threshold distance in the vector space. Some embodiments then iterate through each of the core pixel vectors and create a graph of reachable pixel vectors. In such embodiments, nodes on the graph are identified in response to non-core corresponding pixel vectors within a threshold distance of a core pixel vector on the graph and in response to core pixel vectors on the graph being reachable by other core pixel vectors on the graph. Two pixel vectors are reachable from one another if there is a path from one pixel vector to the other pixel vector, where every link and the path is a core pixel vector and within a threshold distance of one another. The set of nodes in each resulting graph, in some embodiments, are designated as a cluster, and points excluded from the graphs are designated as outliers that do not correspond to clusters. In some embodiments, the processor then determines the centroid of each cluster in the spatial dimensions of the pixel vectors.

In some embodiments, the processor identifies objects and features in the captured image based on the change in pixel color intensity between adjacent pixels. For instance, the processor identifies objects and features by observing a sudden increase then decrease in pixel color intensity or an increase in pixel color intensity followed by constant pixel color intensity or constant pixel intensity followed by a decrease in pixel intensity or by observing other patterns in pixel color intensity. For example, the processor identifies edges and corners in a captured image by determining the change in pixel color intensity between adjacent pixels of the image. In some embodiments, the processor determines change in pixel color intensity of pixels in a first area of the image bounded within a window of predetermined size. If insignificant changes in pixel color intensity are observed in the first area, the processor moves the window in any direction (e.g., horizontal, vertical, etc.) to observe pixels in another area of the image until an area having significant changes in pixel intensity is observed. If significant changes in pixel intensity are observed in the first area, the processor moves the window in a horizontal direction (or in other instances another direction) to observe pixels in a second area of the image, and if insignificant changes in pixel intensity are observed in the second area, the processor moves the window back to the first area where significant changes in pixel intensity was observed, then tries moving the window in a vertical direction (or in other instances another direction different from the previous direction) to observe if significant changes in pixel intensity are still observed. The processor continues moving the window in a vertical direction and checking if significant changes in pixel intensity are still observed, and at each instance of moving the window in a vertical direction the processor moves the window in a horizontal direction to check if there are significant changes in pixel intensity in the horizontal direction as well. If significant changes in pixel intensity are observed in only one direction (e.g., horizontal or vertical direction), the processor identifies an edge. If significant changes in pixel intensity are observed in two or more directions, the processor identifies a corner (e.g., horizontal and vertical directions). The directions described herein are exemplary and used to explain the concept of identifying edges and corners. In other embodiments, other directions can be used and the order of steps described can be different.

In some embodiments, the processor determines the change in pixel color intensity by determining entropy within a particular area of an image wherein high entropy signifies large changes in pixel intensity within the particular area. If there are no changes or very small changes in pixel intensity within the particular area of the image then the entropy is very close to a value of zero. In some embodiments, the processor determines change in pixel color intensity by mapping pixel intensities of pixels within a particular area of an image to a continuous function and determining the derivative of that function. With the derivative being the slope, a derivative of zero is indicative of no change in pixel intensity while a derivative approaching one is indicative of a large change in pixel intensity. In some embodiments, the processor uses other methods such as Haar or Canny to detect features and objects.

In some embodiments, the processor extracts doorway features in the captured image using methods such as those described in 62/613,005, 62/616,928, and Ser. No. 15/614,284, the entire contents of which are hereby incorporated by reference.

In some embodiments, the processor identifies the locations captured in an image by matching extracted objects and features of the captured image with objects and features in the map of the environment by comparing pixel intensity values of the objects and features. For example, the processor compares groups of pixels of different objects having similar pixel color intensities that were extracted from the captured image using thresholding with groups of pixels of objects in the map having similar pixel color intensities and identifies a match when (e.g., during evaluation a plurality of candidate matches) a number of consecutive pixel color intensities (e.g., adjacent in pixel space) are equal or similar, to within a tolerance range of one another (e.g., determined to correspond based on similarity of the values). In some embodiments, the processor identifies the locations captured in an image by matching extracted objects and features of the captured image with objects and features in the map of the environment by aligning objects and features. For example, the processor identifies the locations captured in an image within a map of the environment by aligning features such as edges, corners, doorways, etc. extracted using the extraction methods described above with edges, corners, doorways, etc. in the map. In some embodiments, the processor aligns edges, corners, doorways, etc. of the captured image with edges, corners, doorways, etc. in the map, and if they match, the processor checks if other objects extracted from the image also align with similar objects in the map. In some embodiments, the processor further compares pixel intensity values of aligned objects and features to verify they match.

In some instances, the processor identifies the locations captured in an image by matching extracted objects and features of the captured image with objects and features in the map of the environment using convolution. Some embodiments implement a kernel function that determines an aggregate measure of differences (e.g., a root mean square value) between some or all of a collection of adjacent pixels in the captured image relative to a particular area of the map to which the kernel function is applied. Some embodiments then determine the convolution of this kernel function over the particular area of the map, e.g., in some cases with a stride of greater than one pixel value. Some embodiments then select a minimum value of the convolution as a match that aligns the portion of the captured image from which the kernel function was formed with the particular area of the map to which the convolution was applied.

In some embodiments, a point to point distance metric minimization technique or other similar mathematical method is used to find closest match between the captured image and an area of the map. In some embodiments, the processor uses scan matching techniques wherein optimization algorithms, such as Gauss-Newton or Levenberg-Marquardt, are used to find the best match between the captured image and an area within the map by minimizing the error between the data of the captured image and the map. In some embodiments, the processor uses a metric, such as the Szymkiewicz-Simpson coefficient, to indicate how good of a match there is between the captured image and a particular area of the map. In some embodiments, the processor matches objects and features of the captured image with objects and features of a particular area within the map using more than one approach to improve accuracy of the match.

In some instances where linear algebra is used, Basic Linear Algebra Subprograms (BLAS) are implemented to carry out operations such as vector addition, vector norms, scalar multiplication, matrix multiplication, matric transpose, matrix-vector multiplication, linear combinations, dot products, cross products, and the like.

Some embodiments down-res images to afford faster matching, e.g., by selecting every other, every fifth, or more or fewer pixel vectors, or by averaging adjacent pixel vectors to form lower-resolution versions of the image and map to be matched. The resulting alignment may then be applied to align the higher resolution image and map.

In some embodiments, the processor scales the captured images and compares the scaled images with different areas within the map of the environment to identify similar features and the location captured in the image. In some embodiments, the processor compares several variations of each image and several variations of the map. In some embodiments, the processor assigns a probability of the image and a particular area of the map matching. In some embodiments, the processor selects the match having highest probability of matching. In some embodiments, the processor continuously considers different matches over time as more data is collected and may determine that the captured image has a higher probability of matching a different area of the map than the initially chosen matching area of the map. In some embodiments, the processor discards matches having a probability of matching below a predetermined threshold. In some embodiments, the processor of the robotic device transmits potential matches to the application of the communication device and a user confirms or denies the suggested match.

In some embodiments, the processor of the robotic device compares images received from the application of the communication device to images of the environment stored in a memory of the robotic device to determine the location of the environment captured in the received images. In some embodiments, the application of the communication device transmits a recorded or streams a real-time video of the environment to the processor of the robotic device and the processor analyzes frames from the video to determine the location of the environment captured in the video within the map of the environment. In some embodiments, the processor uses a video capturing a succession of different locations within the environment to determine a path of the robotic device that follows the same succession of the locations captured in the video. In some embodiments, the processor saves the path of the robotic device for future use.

In some embodiments, a first portion of operations, such as those described above, are executed by the application of the communication device and a second portion of the operations are executed by the processor of the robotic device. For example, in some embodiments, the application of the communication device has access to the map of the environment and performs at least some of the operations, such as those described above, and transmits the information to the processor of the robotic device. In some embodiments, the processor instructs the robotic device to execute a particular action based on the received information. In some embodiments, at least a portion of operations, such as those described above, are off-loaded to an external processor.

In some embodiments, the processor of the robotic device receives images or videos captured from other imaging devices, such as imaging devices fixed in the environment for monitoring and security purposes (e.g., closed circuit TV) or imaging devices of other robotic devices.

In some embodiments, the map of the environment is, for example, a map of a room, a house, a commercial building, a stadium, a city, a state, or another area. In some embodiments, the method described above is used to instruct a robotic device to navigate to and/or service a particular area of the environment. For instance, the application of the communication device transmits captured images of a bedroom to a robotic floor-cleaning device, and using the operations described above, the processor of the robotic floor-cleaning device identifies the location of the bedroom captured in the received images within a stored map of the house and instructs the robotic floor-cleaning device to navigate to the room and clean the floor. For example, the application of the communication device transmits captured images of a house to a robotic taxi, and using the operations described above, the processor of the robotic taxi identifies the location of the house captured in the received images within a stored map of the city and instructs the robotic taxi to navigate to the house to pick up a passenger. In another example, the application of the communication device transmits captured images of a bush fire to a robotic fire truck, and using the operations described above, the processor of the robotic fir truck identifies the location of the brush fire captured in the received images in a stored map of the city and instructs the robotic fire truck to navigate to the brush fire and put it out. Other applications can include robotic tow truck services, robotic car rental services, and robotic delivery services.

In some embodiments, the processor of the robotic device creates a map of the environment using mapping methods such as those described in U.S. patent application Ser. Nos. 16/048,179, 16/048,185, 16/163,541, 16/163,562, 16/163,508 and 62/614,449, the entire contents of which are hereby incorporated by reference. In some embodiments, the processor stores the map of the environment in a memory of the robotic device. In some embodiments, an application of a communication device is used to create a map of the environment using methods such as those described in U.S. Patent Application No. 62/681,965, the entire contents of which are hereby incorporated by reference.

In some embodiments, the robotic device is paired with the application of the communication device using pairing methods such as those described in U.S. patent application Ser. No. 16/109,617.

In some embodiments, the robotic device includes one or more autonomous or semi-autonomous devices including communication, an actuator, mobility, and/or processing components. For example, the robotic device may include a casing (like a shell), a chassis, a set of wheels, a suspension system, a motor configured to drive the wheels, a receiver that acquires signals, a transmitter that transmits signals, a processor, a storage medium, a controller, network (e.g., wireless) communications, power management (like a battery), USB ports etc., and one or more clock or synchronizing device. In addition, the robotic device may include a mapping module, localization module, path planning module, user interface module, scheduling module, and various sensors. Examples of sensors include tactile sensors, depth sensors such as LDS, time-of-flight sensors, depth cameras, movement sensors, such as an odometer, inertial measurement units (like with a three-axis accelerometer and a three-axis gyroscope), optical flow sensors (e.g., a visual odometry sensor facing the ground), and other types of sensors useful to the functionality of the robotic device. The list of components presented is not meant to be an exhaustive list of possible components of the robotic device but is rather an example of possible components the robotic device may have. Components and modules may be separate and combined with the main processor of the robotic device or may be integrated within the main processor of the robotic device. Other types of robotic devices with other configurations may also be used.

FIG. 1 illustrates a flowchart describing some embodiments of a method including steps 101-106 for identifying a particular location of an environment captured in an image within a map of the environment and directing a robotic device to navigate to that location.

FIG. 2 illustrates an example of how a corner is detected by a processor of a robotic device. The process begins with the processor considering area 200 on wall 201 captured in an image and observing the changes in pixel color intensity of the pixels in area 200 as shown in FIG. 2A. After observing insignificant changes in pixel color intensity, the processor moves on to considering area 202 in the capturing image containing edge 203 joining walls 201 and 204 and observes large changes in pixel color intensity in the pixels along edge 203 as illustrated in FIG. 2B. In FIG. 2C the processor moves on to consider another area 205 on wall 204 to the right of area 202 and observes no changes in pixel color intensity. In FIG. 2D the processor returns back to area 202 containing edge 203 where large changes in pixel intensity were observed, then considers area 206 above area 202 as shown in FIG. 2E and observes changes in pixel color intensity along edge 203. Finally, in FIG. 2F the processor moves to consider area 207 below area 202 with edges 203 and 208 joining walls 201 and 204 and floor 209. The processor observes changes in pixel color intensity along edge 203 and along edge 208. Upon discovering changes in pixel color intensity in two directions along both edges 203 and 208, a corner is identified. Upon discovering changes in pixel color intensity in one direction, an edge is identified.

Figure 3:
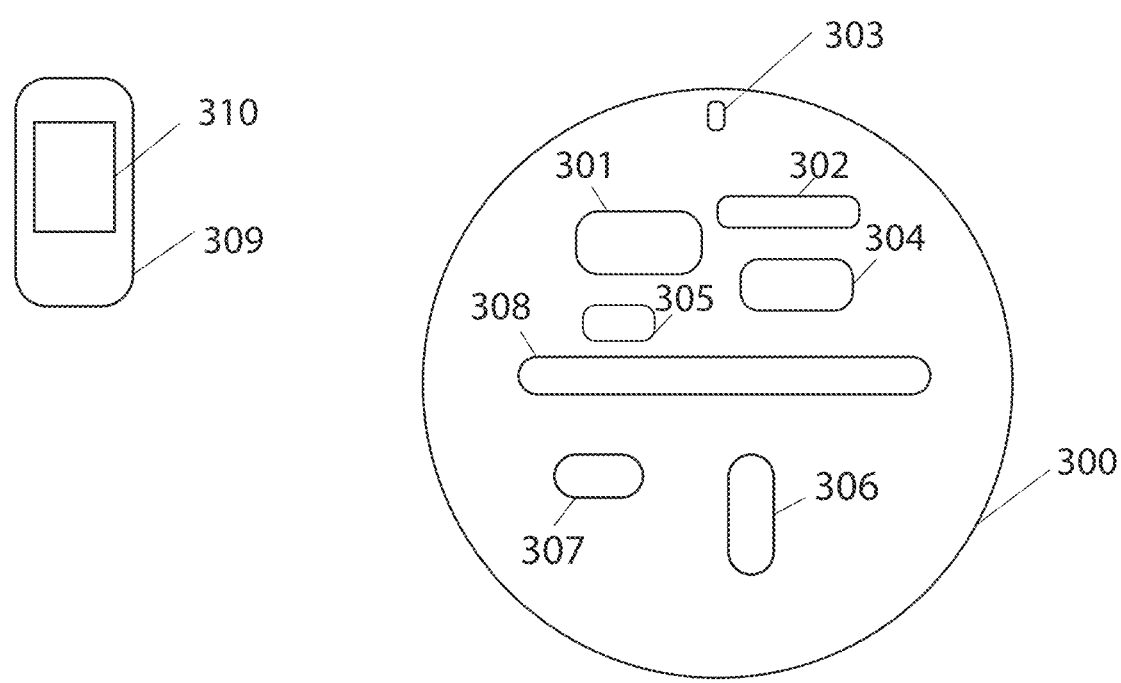
FIG. 3 illustrates an example of a robotic device and communication device that may be used to execute at least some of the techniques described herein in some embodiments.

FIG. 3 illustrates an example of a robotic device 300 with processor 301, memory 302, a first set of sensors 303, second set of sensors 304, network communications 305, movement driver 306, timer 307, and one or more cleaning tools 308. The first and second set of sensors 303 and 304 may include depth measuring devices, movement measuring devices, and the like. In some embodiments, the robotic device may include the features of a robotic device described herein. The shape of the illustrated features is not meant to imply that the robot has a round shape or that any feature has any particular shape. In some embodiments, program code stored in the memory 302 and executed by the processor 301 may effectuate the operations described herein. Some embodiments additionally include communication device 309 having a touchscreen 310 on which an application of the communication device is executed.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. One or more tangible, non-transitory, machine-readable medium storing instructions that when executed by one or more processors effectuate operations comprising:
    receiving, with the one or more processors of a robot, an image of an environment from an imaging device separate from the robot;
    obtaining, with the one or more processors of the robot, raw pixel intensity values of the image;
    extracting, with the one or more processors of the robot, objects and features in the image by grouping pixels with similar raw pixel intensity values, and by identifying areas in the image with greatest change in raw pixel intensity values;
    determining, with the one or more processors of the robot, an area within a map of the environment corresponding with the image by comparing the objects and features of the image with objects and features of the map;
    inferring, with the one or more processors of the robot, one or more locations captured in the image based on the location of the area of the map corresponding with the image; and,
    instructing, with the one or more processors of the robot, the robot to navigate to the one or more locations captured in the image;
    wherein the robot is paired with an application of a smart device configured to:
        receive an input designating a modification to the map of the environment; and
        transmit the modified map to at least one of: the one or more processors of the robot via the cloud, the cloud, the one or more processors of the robot and the cloud, and the one or more processors of the robot.

2. The one or more media of claim 1, wherein obtaining the raw pixel intensity values of the image comprises normalizing pixel intensity values of the image, and forming the raw pixel intensity values of the image based on the normalized pixel intensity values.

3. The one or more media of claim 1, wherein pixels with similar pixel intensity values are grouped together using thresholding.

4. The one or more media of claim 1, wherein the areas of the image with greatest change in raw pixel intensity values are determined by mapping a continuous function to at least a portion of the raw pixel intensity values and taking the derivative of the function.

5. The one or more media of claim 1, wherein the areas of the image with greatest change in raw pixel intensity values are edges, corners, or doors.

6. The one or more media of claim 1, wherein the area within the map of the environment corresponding with the image is determined by matching a pattern in raw pixel intensity values of the image to raw pixel intensity values of different areas within the map and choosing the area within the map that best matches the pattern in the raw pixel intensity values of the image as the area corresponding with the image.

7. The one or more media of claim 6, wherein the pattern is an edge, corner, or door.

8. The one or more media of claim 1, wherein the operations further comprise:
    instructing, with the one or more processors of the robot, the robot to execute a task in the one or more locations.

9. The one or more media of claim 1, wherein the robot performs work in the one or more locations captured in the image.

10. The one or more media of claim 1, wherein the operations further comprise:
    extracting, with the one or more processor of the robot, features in the image based on raw sensor data of the image and a first and second derivative of the raw sensor data.

11. The one or more media of claim 1, wherein:
    the application is further configured to receive an input designating at least one of: a type of work to be performed by the robot in a particular area chosen within the image, a particular setting of the robot in a particular area chosen within the image, a particular time to perform work by the robot in a particular area chosen within the image, and a virtual boundary in a particular location within the image; and
    the operations further comprise:
        updating, with the one or more processors of the robot, the map based on the virtual boundary.

12. The one or more media of claim 1, wherein the application is further configured to receive an input designating an instruction comprising at least one of: a path of the robot, an adjustment to the path of the robot, an adjustment to the map, an order of rooms within the environment the robot is to perform work within, areas within the environment the robot is to perform work within, areas within the environment the robot is to avoid, a type of work the robot is to perform within an area, a location within the environment the robot is to navigate to, a modification to a pre-existing label of an area within the environment, and a label for an area within the environment.

13. An apparatus, comprising:
    a robot comprising:
        a chassis;
        drive wheels connected to the chassis;
        one or more processors;
        one or more sensors; and,
        one or more tangible, non-transitory, machine-readable medium storing instructions that when executed by the one or more processors effectuate operations comprising:
            receiving, with the one or more processors of the robot, an image of an environment captured by an imaging device separate from the robot;
            obtaining, with the one or more processors of the robot, raw pixel intensity values of the image;
            extracting, with the one or more processors of the robot, objects and features in the image by grouping pixels with similar raw pixel intensity values, and by identifying areas in the image with greatest change in raw pixel intensity values;
            determining, with the one or more processors of the robot, an area within a map of the environment corresponding with the image by comparing the objects and features of the image with objects and features of the map;
inferring, with the one or more processors of the robot, one or more locations captured in the image based on the location of the area of the map corresponding with the image; and,
instructing, by the one or more processors of the robot, the robot to navigate to the location captured in the image and execute a task;
wherein the robot is paired with an application of a smart device configured to:
receive an input designating a modification to the map of the environment; and
transmit the modified map to at least one of: the one or more processors of the robot via the cloud, the cloud, the one or more processors of the robot and the cloud, and the one or more processors of the robot.

14. A method, comprising:
generating, with a processor of a robot, a map of an environment of the robot and a path of the robot within the environment;
transmitting, with the processor of the robot, the map of the environment and the path of the robot to an application of a computing device paired with a wireless controller of the robot;
displaying, with the application of the computing device, the map and the path of the robot;
receiving, with the application of the computing device, an input designating an instruction comprising at least one of: the path of the robot, an adjustment to the path of the robot, an adjustment to the map, an order of rooms within the environment the robot is to perform work within, areas within the environment the robot is to perform work within, areas within the environment the robot is to avoid, a type of work the robot is to perform within an area, a location within the environment the robot is to navigate to, a modification to a pre-existing label of an area within the environment, and a label for an area within the environment, wherein:
the robot comprises:
a chassis;
drive wheels connected to the chassis;
a plurality of sensors comprising at least one of a laser distance sensor and a camera; and
a tangible, non-transitory, machine-readable medium; and
the computing device comprises:
a processor;
a tangible, non-transitory, machine-readable medium;
a microphone;
a speaker;
a screen;
at least one user interface; and
a camera.

15. The method of claim 14, wherein a first operation is executed with the processor of the robot and a second operation is executed with the application of the computing device or the first operation is executed with the application of the computing device and the second operation is executed with the processor of the robot.

16. The method of claim 14, further comprising:
identifying, with the processor of the robot, an area of the environment by matching sensor data indicative of features within the area of the environment with features in the map of the environment.

17. The method of claim 14, further comprising:
receiving, with the processor of the robot, at least one voice command comprising at least one of: an instruction to navigate to a particular area of the environment, an instruction to perform work within a particular area of the environment, and an instruction to perform a particular type of work within a particular area of the environment; and
executing, with the robot, the at least one voice command.

18. The method of claim 14, further comprising:
displaying, with the application of the computing device, icons representing different areas within the map of the environment.

19. The method of claim 14, further comprising:
receiving, with the application of the computing device, an input designating a particular color assignment for areas within the environment, wherein each color is indicative of at least one of: a type of work to be performed by the robot, a particular setting of the robot, and a particular time to perform work by the robot.

20. The method of claim 14, further comprising:
receiving, with the processor of the robot, an image of the environment from an imaging device separate from the robot;
obtaining, with the processor of the robot, raw pixel intensity values of the image;
extracting, with the processor of the robot, objects and features in the image by grouping pixels with similar raw pixel intensity values, and by identifying areas in the image with greatest change in raw pixel intensity values;
determining, with the processor of the robot, an area within the map of the environment corresponding with the image by comparing the objects and features of the image with objects and features of the map;
inferring, with the processor of the robot, one or more locations captured in the image based on the location of the area of the map corresponding with the image; and,
instructing, with the processor of the robot, the robot to navigate to the one or more locations captured in the image.

* * * * *